(12) United States Patent
Suomela et al.

(10) Patent No.: US 10,554,332 B2
(45) Date of Patent: Feb. 4, 2020

(54) COMMUNICATING INDUSTRIAL DEVICE DATA IN A COMMUNICATIONS SYSTEM

(71) Applicant: ABB Technology Oy, Helsinki (FI)

(72) Inventors: Kalle Suomela, Järvenpää (FI); Ville Särkimäki, Espoo (FI); Olli Alkkiomäki, Helsinki (FI); Teemu Tanila, Espoo (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/456,553

(22) Filed: Mar. 12, 2017

(65) Prior Publication Data
US 2017/0272203 A1 Sep. 21, 2017

(30) Foreign Application Priority Data
Mar. 16, 2016 (EP) .................................... 16160590

(51) Int. Cl.
*H04L 1/00* (2006.01)
*H04W 88/02* (2009.01)

(52) U.S. Cl.
CPC ........... *H04L 1/0025* (2013.01); *H04W 88/02* (2013.01)

(58) Field of Classification Search
CPC ........ G01R 31/42; H04L 1/0025; H04Q 9/00; H04W 88/02
See application file for complete search history.

(56) References Cited

U.S. PATENT DOCUMENTS

| 5,760,617 A * | 6/1998 | Coln ................ H03C 3/00 327/101 |
| 9,826,387 B2 * | 11/2017 | Hu ................ H02M 5/297 |
| 10,182,342 B2 * | 1/2019 | Hu ................ H04L 67/125 |
| 2010/0004774 A1 | 1/2010 | Chen |

(Continued)

FOREIGN PATENT DOCUMENTS

| CN | 103762937 A | 4/2014 |
| CN | 104375822 A | 2/2015 |

(Continued)

OTHER PUBLICATIONS

European Search Report, EP16160590, ABB Technology Oy, dated Sep. 12, 2016, 6 pages.

(Continued)

*Primary Examiner* — Bobbak Safaipour
(74) *Attorney, Agent, or Firm* — Taft Stettinius & Hollister LLP; J. Bruce Schelkopf (57) ABSTRACT

Automated power conversion device operation and status data is received in a local terminal device. The operation and status data is forwarded from the local device to a remote device via a communications network. The remote device receives the operation and status data, and compares the received automated power conversion device operation and status data with automated power conversion device history data stored in a memory. Based on the comparing, the remote device generates a service recommendation for the automated power conversion device, Based on the generating, the remote device transmits the service recommendation to the local device via the communications network. The service recommendation is received in the local device. The local device displays the received service recommendation in to the user of the local device.

13 Claims, 4 Drawing Sheets

(56) References Cited

U.S. PATENT DOCUMENTS

| | | | | |
|---|---|---|---|---|
| 2012/0072868 A1* | 3/2012 | Metso | .................... | G06F 3/0236 |
| | | | | 715/810 |
| 2012/0116696 A1* | 5/2012 | Wank | ..................... | G01R 31/42 |
| | | | | 702/58 |
| 2012/0173035 A1* | 7/2012 | Abe | .......................... | H02J 3/00 |
| | | | | 700/297 |
| 2015/0048157 A1* | 2/2015 | Juslin | ................. | G05B 19/0426 |
| | | | | 235/375 |
| 2016/0360394 A1* | 12/2016 | Hu | .......................... | H04W 4/70 |

FOREIGN PATENT DOCUMENTS

| | | | |
|---|---|---|---|
| CN | 104836454 A | * | 8/2015 |
| WO | 2007143813 A1 | | 12/2007 |
| WO | 2015131166 A1 | | 9/2015 |

OTHER PUBLICATIONS

Chinese Office Action dated Oct. 10, 2019 issued in CN Application No. 201710150447.0 (19 pages).

\* cited by examiner

Fig. 4 ized summary of features disclosed herein to provide a basic understanding of some exemplary aspects of the invention. This summary is not an extensive overview of the invention. It is not intended to identify key/critical elements of the invention or to delineate the scope of the invention. Its sole purpose is to present some concepts disclosed herein in a simplified form as a prelude to a more detailed description.
COMMUNICATING INDUSTRIAL DEVICE DATA IN A COMMUNICATIONS SYSTEM

TECHNICAL FIELD

The invention relates to communications, and particularly to communications between an industrial automation device and a network apparatus.

BACKGROUND

The following background description art may include insights, discoveries, understandings or disclosures, or associations together with disclosures not known to the relevant art prior to the present invention but provided by the present disclosure. Some such contributions disclosed herein may be specifically pointed out below, whereas other such contributions encompassed by the present disclosure the invention will be apparent from their context.

Frequency converters are used to change frequency and magnitude of electricity supplied to a load. Frequency converters are being used for example in alternating current (AC) motor drives. In exemplary operation, a frequency converter receives AC current from an electrical power supply and converts the frequency of the received AC current to another frequency after which the AC current is supplied to an AC electric motor. Also further parameters, for example, a voltage level of the received AC current may be changed. The AC motors are used in various applications including for example fans and pumps. In many applications the use of frequency converters may provide significant energy savings compared to supplying electrical power having a constant frequency.

To facilitate service and maintenance of a frequency converter, the frequency converter may be configured to record various internal variables regarding the condition and status of the frequency converter. However, going through this type of data to decide which maintenance actions are needed is inefficient and may take a long time for the service personnel on-site. For example, manual life cycle assessment tools or maintenance interval charts may be used.

BRIEF DESCRIPTION

The following presents a simplified summary of features disclosed herein to provide a basic understanding of some exemplary aspects of the invention. This summary is not an extensive overview of the invention. It is not intended to identify key/critical elements of the invention or to delineate the scope of the invention. Its sole purpose is to present some concepts disclosed herein in a simplified form as a prelude to a more detailed description.

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide a method, system, apparatus and a computer program product for communicating frequency converter status data.

BRIEF DESCRIPTION OF DRAWINGS

In the following the invention will be described in greater detail by means of preferred embodiments with reference to the attached drawings, in which.

DETAILED DESCRIPTION OF THE INVENTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
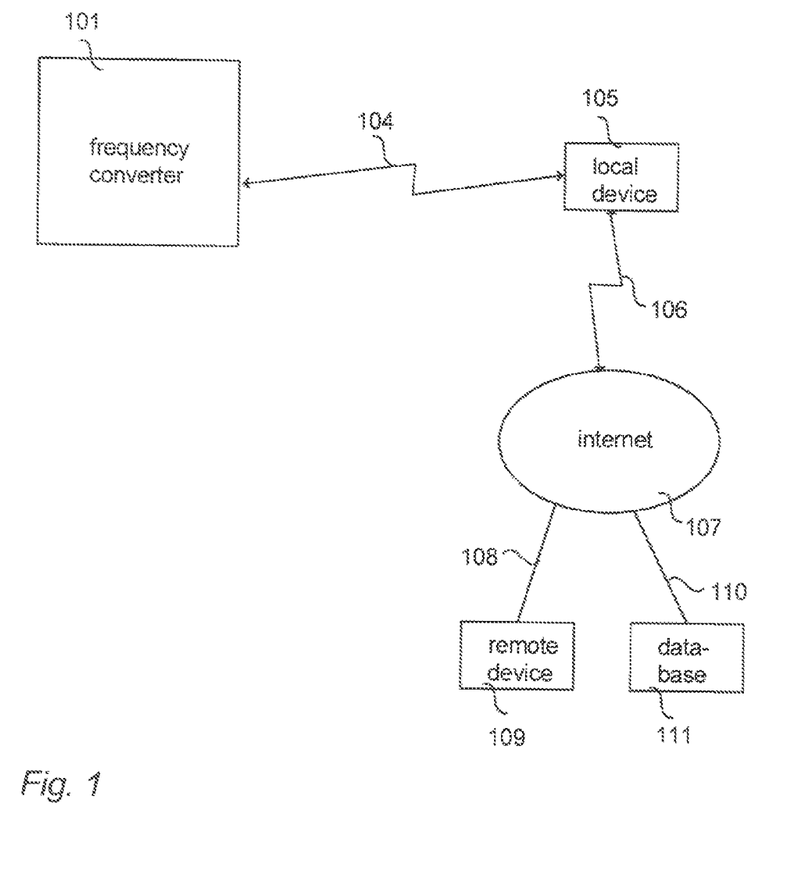
FIG. 1 illustrates a wireless communication system to which embodiments of the invention may be applied.

FIG. 1 illustrates a wireless communication scenario to which embodiments of the invention may be applied. Referring to FIG. 1, an example of a radio system to which embodiments of the invention may be applied, is based on LTE network elements. However, an embodiment is not limited to the LTE radio communications systems but may also be implemented in other radio communications systems, such as 3G, 4G, 5G, LTE-A, UMTS (universal mobile telecommunications system), EDGE, WCDMA, Bluetooth network, WLAN or any other mobile or wireless network. In an embodiment, the presented solution may be applied between user equipment belonging to different but compatible systems such as LTE and UMTS.

A general architecture of a communication system is illustrated in FIG. 1. FIG. 1 illustrates a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements, and protocols used in or for wireless communication are irrelevant to the actual invention. Therefore, they need not be discussed in more detail here.

FIG. 1 illustrates a communication system according to an embodiment. FIG. 1 illustrates an exemplary communications system in which a user terminal 105 is able to connect to the internet 107 and to one or more frequency converters 101. The user terminal 105 may be a local terminal device (local device) located on-site at a close proximity of the frequency converter 101. The local terminal device 105 may comprise a user equipment such as a smartphone, mobile phone, tablet computer or laptop computer. A connection 106 of the local terminal device 105 to the internet 107 may be provided by a cellular, wireless or wired link. A connection 104 of the local terminal device 105 to the frequency converter 101 may be provided e.g. by a Bluetooth, NFC (near field communication), or inductive connection (such as an inductive connection according to an inductive power standard (Qi) by the Wireless Power Consortium).

A network apparatus 109 may be a remote device such as a remote terminal device, server or database located at a service center, for facilitating service and maintenance of the frequency converter 101. The remote device 109 may facilitate different ways of how to communicate with the frequency converter 101 via the local terminal device 105. The remote device 109 may comprise e.g. a desktop computer, laptop computer, tablet computer, smartphone, mobile phone, server, database, etc. Any suitable technology that makes it possible to store frequency converter history data and other frequency converter specific data into a service center database 111 may be utilized. For example, a cloud service (cloud computing) may be used via the internet 107 to store frequency converter history data and other frequency converter data into the service center database 111. The local and remote devices may be capable of communicating with each other via the internet 107 by utilizing the cloud service.

Figure 2:
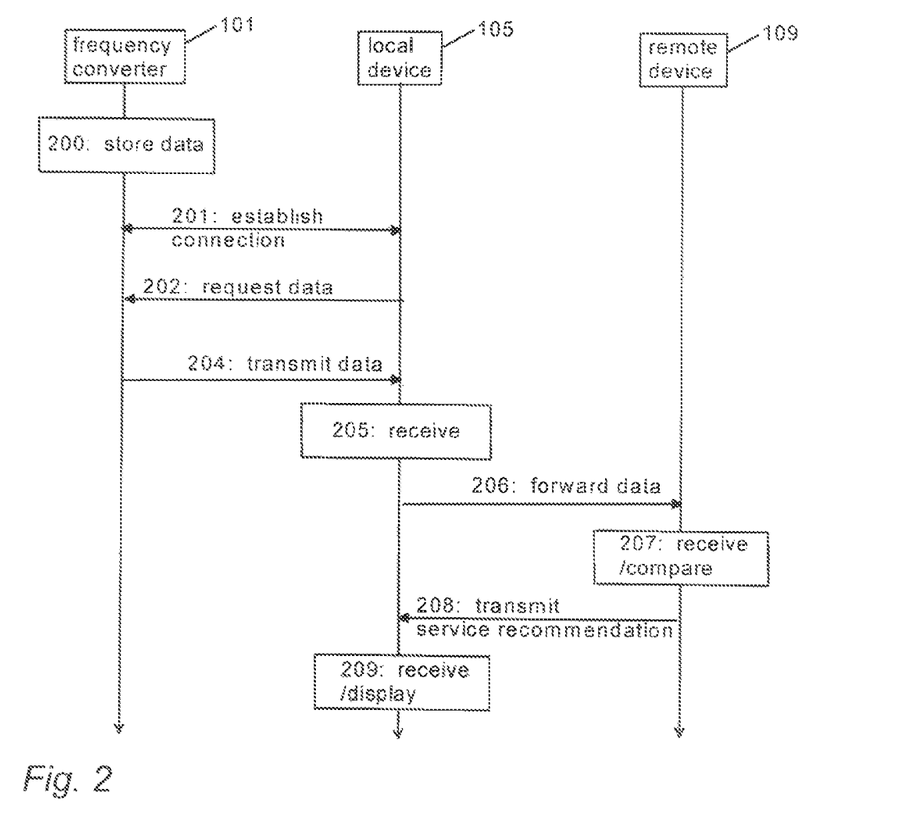
FIG. 2 is a signaling diagram of a procedure for communicating frequency converter data according to an embodiment of the invention.
Figure 3:
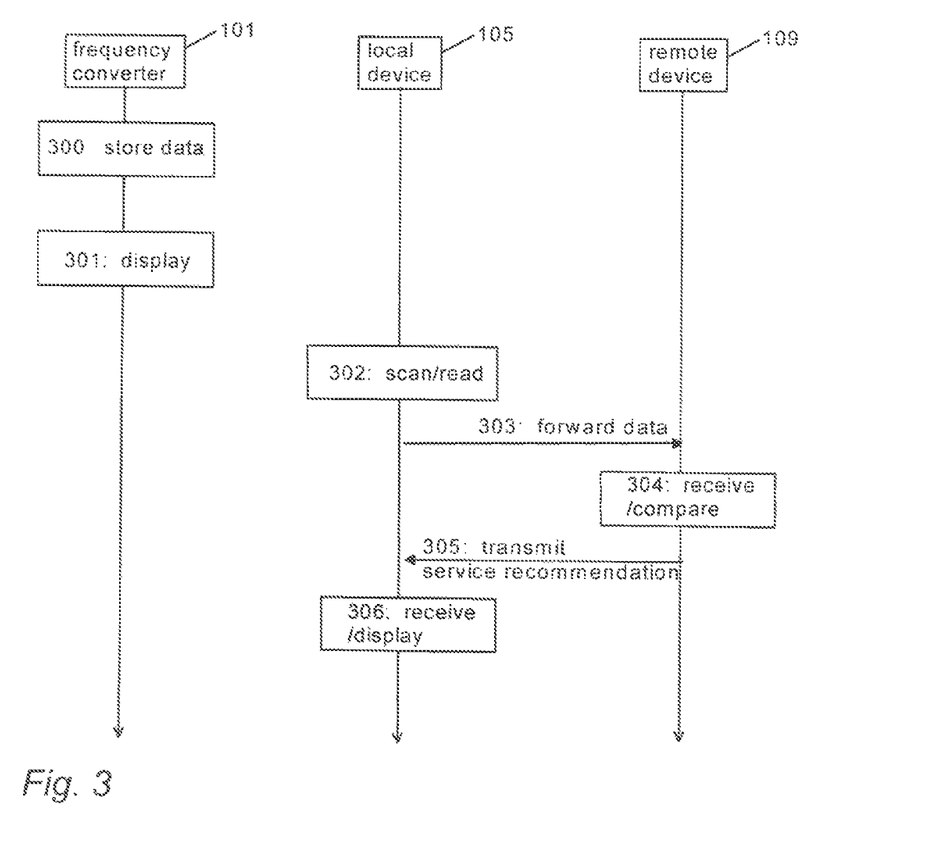
FIG. 3 is a signaling diagram of a procedure for obtaining frequency converter data according to an embodiment of the invention.

Let us now describe embodiments of the invention with reference to FIG. 2 and FIG. 3. FIG. 2 is a signaling diagram illustrating a method for signaling frequency converter data between a frequency converter, and network nodes of a communication system e.g. a local terminal device 105 and a remote device 109. The network node 105, 109 may be a terminal device, user equipment, host computer, server computer, base station, access node or any other network element. For example, the server computer or the host computer may generate a virtual network through which the host computer communicates with the terminal device.

Referring to FIG. 2, the frequency converter 101 is configured to store (block 200) data related to various internal variables and key performance indicators (KPI) about the condition/status of the frequency converter or the drive system (e.g. power-on time, motor running hours, fan running hours, estimation of the DC (direct current) link capacitor lifetime, load current histogram, temperature (ambient temperature, insulated gate bipolar transistor (IGBT) temperature, control board temperature, etc.), frequency, DC link voltage, current(s), status words, internal control references, etc.) (also referred to as frequency converter operation and status data herein). The local terminal device and the frequency converter are capable of establishing (block 201) a wireless communications link 104 with each other. After the communications link 104 has been established, the local terminal device 105 may transmit (block 202) to the frequency converter a data request, the data request requesting the frequency converter 101 to transmit to the local terminal device 105 the stored frequency converter operation and status data. In block 203 the frequency converter 101 receives the data request from the local device 105 via the communications link 104. In response to the receiving 203, the frequency converter 101 is configured to transmit (block 204) the requested frequency converter operation and status data to the local terminal device 105 via the communications link 104. The local terminal device 105 receives (block 205) the frequency converter operation and status data, and based on the receiving 205, forwards (block 206) the frequency converter operation and status data to the remote device 109 via a communications network 107.

The frequency converter operation and status data is received (block 207) in the remote device 109 from the local terminal device 105. The remote device 109 compares (block 207) the frequency converter operation and status data received 207 in the remote device with frequency converter history data stored in a memory. Based on the comparing 207, the remote device 109 generates (block 207) a service recommendation for the frequency converter 101. Based on the generating, the remote device 109 transmits (block 208) the service recommendation to the local terminal device 105 via the communications network 107. The local terminal device 105 receives (block 209) the service recommendation from the remote device 109, and displays the received service recommendation on a display of the local terminal device 105 to the user of the local terminal device 105.

Herein, the communications link established between the local terminal device 105 and the frequency converter 101 may comprise e.g. a Bluetooth connection, inductive connection, wired connection, and/or near field communication (NFC) connection.

The local terminal device 105 may be configured to transmit (not shown in FIG. 2) an acknowledgement message the remote device 109, in response to receiving 209 the service recommendation. The local terminal device 105 may be configured to transmit a negative acknowledgement message to the remote device 109, if a user input indicates that the user of the local terminal device requests further information on the service recommendation. The remote device 109 may be configured to receive (not shown in FIG. 2) the acknowledgement or negative acknowledgement. Based on the negative acknowledgement, the remote device 109 may be configured to transmit further information related to the service recommendation. This may be carried out automatically in the remote device 109.

FIG. 3 is a signaling diagram illustrating a method for obtaining frequency converter data in a network node of a communication system, e.g. in a local terminal device 105 and a remote device 109. The network node 105, 109 may be a terminal device, user equipment, host computer, server computer, base station, access node or any other network element. For example, the server computer or the host computer may generate a virtual network through which the host computer communicates with the terminal device.

Referring to FIG. 3, the frequency converter 101 is configured to store (block 300) data related to various internal variables and key performance indicators (KPI) about the condition/status of the frequency converter or the drive system (e.g. power-on time, motor running hours, fan running hours, estimation of the DC link capacitor lifetime, load current histogram, etc.) (also referred to as frequency converter operation and status data herein). The local terminal device 105 is configured to read (block 302) the frequency converter operation and status data by scanning a respective QR code from the frequency converter, and based on the reading 302, the local terminal device 105 forwards (block 303) the frequency converter operation and status data to the remote device 109 via a communications network 107. The frequency converter may be configured to display (block 301) the QR code on its display e.g. in response to an act by the user (for example, the user pressing an appropriate button), so that the local terminal device is able to scan the QR code.

The frequency converter operation and status data is received (block 304) in the remote device 109 from the local terminal device 105. The remote device 109 compares (block 304) the frequency converter operation and status data received 303 in the remote device with frequency converter history data stored in a memory. Based on the comparing 304, the remote device 109 generates (block 304) a service recommendation for the frequency converter 101. Based on the generating, the remote device 109 transmits (block 305) the service recommendation to the local terminal device 105 via the communications network 107. The local terminal device 105 receives (block 306) the service recommendation from the remote device 109, and displays 306 the received service recommendation on a display of the local terminal device 105 to the user of the local terminal device 105.

Herein, the local terminal device 105 may be configured to read the information stored in the frequency converter, such that the local terminal device comprises a QR (quick response) code scanner configured to scan a QR code displayed by the frequency converter. Thus, by scanning the QR code, operation and status data comprising information on key performance indicators of the frequency converter and internal variables regarding the condition of the frequency converter, may be obtained in the local terminal device.

The local terminal device 105 may be configured to transmit (not shown in FIG. 3) an acknowledgement message the remote device 109, in response to receiving 306 the service recommendation. The local terminal device 105 may be configured to transmit a negative acknowledgement message to the remote device 109, if a user input indicates that the user of the local terminal device requests further information on the service recommendation. The remote device 109 may be configured to receive (not shown in FIG. 3) the acknowledgement or negative acknowledgement. Based on the negative acknowledgement, the remote device 109 may be configured to transmit further information related to the service recommendation. This may be carried out automatically in the remote device 109.

Thus a frequency converter in a drive system may be configured to record key performance indicators (KPIs) and various internal variables regarding the condition (e.g. power-on time, motor running hours, fan running hours, estimation of the DC link capacitor lifetime, etc.) of the frequency converter and regarding the status of the drive system (e.g. load current histogram, temperature (ambient temperature, insulated gate bipolar transistor (IGBT) temperature, control board temperature, etc.), frequency, DC link voltage, current(s), status words, internal control references). The estimation of the DC link capacitor lifetime may correspond to the component lifetime counters, such as the DC link capacitor lifetime. The frequency converter may be configured to (periodically) store this kind of equipment condition or application performance related information to the internal memory of the frequency converter.

Once in a while a service engineer is able to come on-site to read the recorded values of the KPIs etc. with a mobile terminal device, and send the recorded values to a service database apparatus (i.e. remote device, such as a database server) via a communications connection. The database apparatus is configured to receive and compare the received values with history data stored in the database apparatus regarding the frequency converter in question. Based on the comparison, the database apparatus is configured to trigger transmission of a feedback report to the mobile terminal device located on-site, the feedback report including a proposal for appropriate frequency converter service actions and/or instructions for carrying out the service action(s). For example, service actions such as changing of a cooling fan or DC link capacitors may be triggered this way. If based on the comparison it is deduced in the database apparatus that there is currently no need to perform any service action, the feedback report sent from the database apparatus to the mobile terminal device may include an estimation on the next required service break (date and/or service hour counter reading).

Thus the frequency converter is configured to follow and record certain values, such as internal counters and KPIs, about operating conditions of the frequency converter. The recorded values may be uploaded by the service personnel from the frequency converter to a mobile terminal device (i.e. local device) via a communications link between the frequency converter and the mobile terminal. The uploaded values may be transmitted from the mobile terminal device to the service database apparatus where the latest received values are compared with the previous ones and/or the ones obtained from commissioning and registration. The previous values and/or the values obtained from commissioning and registration may also be referred to as history data. Based on a predefined service program and the uploaded KPIs etc., the service database apparatus is configured to recommend certain service actions regarding the frequency converter with the related contact and ordering information. This means that information on service action recommendations is transmitted from the database apparatus to the mobile terminal device (from which the uploaded values were received from), wherein the mobile terminal device is configured to display the information on the display of the mobile terminal device. Based on the displayed service action information, the service personnel is able to decide whether to carry out the proposed service actions on the frequency converter.

Thus the frequency converter is recording KPI values, and it is possible to read the values to the mobile terminal device e.g. via a Bluetooth connection between the mobile terminal device and the frequency converter. An application is installed in the mobile terminal device handling the reading of the recorded data and forwarding it further to the database apparatus. The database apparatus comprises a processor and memory for storing and comparing this type of KPIs etc. The database apparatus comprises a computer program tool that takes care of the reporting and linking the related information to the feedback report. This enables obtaining service recommendations in the mobile terminal device from the database apparatus.

In response to receiving the service recommendation in the mobile terminal device, the mobile terminal device is configured to display, on a display, the service recommendation to the user of the mobile terminal device (i.e. the service personnel on-site).

In an embodiment, the history data regarding the frequency converter 101 may be stored in the database apparatus 109 and/or in an external memory 111 (in which case the history data is retrieved by the database apparatus from the memory for the comparing).

In an embodiment, the database apparatus 109 is configured to store the received values in the history data in the memory of the database apparatus 109 (and/or in an external memory 111 connected to the database apparatus) for later comparisons.

In an embodiment, the database apparatus 109 calculates based on the key performance indicators/variables, the service recommendation based on a predetermined algorithm.

In an embodiment, the frequency converter operation and status data may be transmitted automatically from the frequency converter 101 to the local terminal device 105 in response to the connection establishment 201, or the local terminal device 105 may be configured to request 202 the operation and status data from the frequency converter 101.

In an embodiment, the frequency converter operation and status data may be forwarded automatically from the local device 105 to the remote device 109 automatically in response to receiving it, or the local terminal device 105 may be configured to forward the operation and status data after recognizing a respective user input indicating that the user of the local device approves the forwarding of the operation and status data to the remote device.

In addition to a drive system/frequency converter, an embodiment may also be applicable to other automated power conversion devices such as AC/DC modules, DC/AC modules, DC/DC modules, programmable logic controllers (PLC), switches, motion controllers, motion drives, servo motors, soft starters, robotics, cars, heavy equipment, and/or any other devices used for industrial automation.

Figure 4:
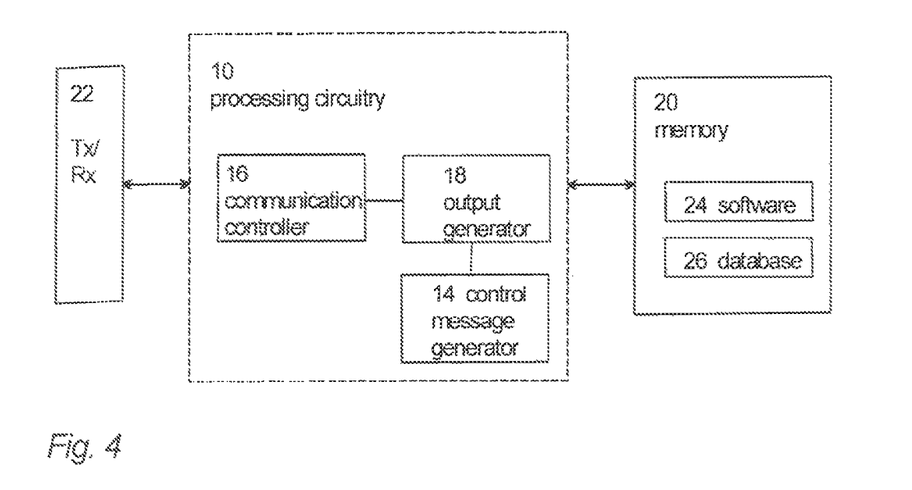
FIG. 4 is a block diagram illustrating an exemplary apparatus.

An embodiment provides an apparatus comprising at least one processor and at least one memory including a computer program code, wherein the at least one memory and the computer program code are configured, with the at least one processor, to cause the apparatus to carry out the procedures of the above-described remote device. The at least one processor, the at least one memory, and the computer program code may thus be considered as an embodiment of means for executing the above-described procedures of the remote device. The apparatus may be comprised in the remote device, e.g. the apparatus may form a chipset or a circuitry in the remote device. In some embodiments, the apparatus is the remote device. FIG. 4 is a block diagram illustrating such an apparatus. The apparatus comprises a processing circuitry 10 comprising the at least one processor. The processing circuitry 10 may comprise a communications controller 16 configured to receive status data related to a frequency converter and received from the frequency converter via at least one network node. The processing circuitry may further comprise an output generator 18 configured to calculate a service recommendation for the frequency converter. The output generator 18 may be configured to generate the recommendation, and output information on the recommendation to a control message generator 14 configured to cause transmission of control data to the local terminal device via a communications network between the local terminal device and the frequency converter.

The processing circuitry may comprise the circuitries 14, 16, 18 as sub-circuitries, or they may be considered as computer program modules executed by the same physical processing circuitry. The memory 20 may store one or more computer program products 24 (software) comprising program instructions that specify the operation of the circuitries. The memory may further store a database 26 comprising frequency controller history data, for example. The apparatus may further comprise an interface 22 (transmitter/receiver Tx/Rx) providing the apparatus with communication capability with network nodes.

As used herein, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used herein, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described above in connection with FIGS. 1 to 4 may also be carried out in the form of one or more computer process defined by one or more computer programs. The computer program shall be considered to encompass also a module of a computer programs, e.g. the above-described processes may be carried out as a program module of a larger algorithm or a computer process. The computer program(s) may be in source code form, object code form, or in some intermediate form, and it may be stored in a carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to cellular or mobile communication systems defined above but also to other suitable communication systems. The protocols used, the specifications of cellular communication systems, their network elements, and terminal devices develop rapidly. Such development may require extra changes to the described embodiments. Therefore, all words and expressions should be interpreted broadly and they are intended to illustrate, not to restrict, the embodiment.

It will be obvious to a person skilled in the art that, as the technology advances, the inventive concept can be implemented in various ways. The invention and its embodiments are not limited to the examples described above but may vary within the scope of the claims.

The invention claimed is:

1. A method of communicating frequency converter data in a communications system, the method comprising
receiving frequency converter operation and status data in a local terminal device;
forwarding the frequency converter operation and status data from the local terminal device to a remote device via a communications network;
receiving the frequency converter operation and status data in the remote device from the local terminal device;
comparing, in the remote device, the frequency converter operation and status data received in the remote device with frequency converter history data stored in a memory, by comparing latest received values with previous ones of one or more of power-on time, motor running hours, fan running hours, estimation of the direct current link capacitor lifetime, load current histogram, ambient temperature, insulated gate bipolar transistor temperature, control board temperature, frequency, direct current link voltage, current, status words, and internal control references;
based on the comparing, generating in the remote device a service recommendation for the frequency converter;
based on the generating, transmitting the service recommendation from the remote device to the local terminal device via the communications network;
receiving the service recommendation in the local terminal device from the remote device;

displaying the received service recommendation in the local terminal device to the user of the local terminal device;

wherein the local terminal device is a user mobile device that communicates with the frequency converter via a local communication link;

wherein the frequency converter operation and status data is transmitted from the frequency converter to the local terminal device, periodically, in response to establishing the local communication link between the local terminal device and the frequency converter, or in response to a request from the local terminal device.

2. The method according to claim 1, wherein the frequency converter operation and status data is transmitted from the frequency converter to the local terminal device, via the local communication link established between the local terminal device and the frequency converter.

3. The method according to claim 1, wherein the frequency converter operation and status data is received in the local terminal device in response to the local terminal device scanning a corresponding QR code displayed on the frequency converter.

4. The method according to claim 1, wherein the frequency converter operation and status data comprises information on key performance indicators of the frequency converter and internal variables regarding the condition of the frequency converter.

5. The method according to claim 4, wherein the frequency converter history data comprise earlier information on key performance indicators of the frequency converter and internal variables regarding the condition of the frequency converter, and information on the type of the frequency converter.

6. A communications system comprising a local terminal device configured to receive frequency converter operation and status data, and forward the frequency converter operation and status data to a remove device via a communications network:

wherein the remove device is configured to receive the frequency converter operation and status data from the local terminal device, compare the frequency converter operation and status data with frequency converter history data stored in a memory, by comparing latest received values with previous ones of one or more of power-on time, motor running hours, fan running hours, estimation of the direct current link capacitor lifetime, load current histogram, ambient temperature, insulated gate bipolar transistor temperature, control board temperature, frequency, direct current link voltage, current, status words, and internal control references, based on the comparing, generate a service recommendation for the frequency converter, and based on the generating, transmit the service recommendation to the local terminal device via the communications network;

the local terminal device being configured to receive the service recommendation in from the remove device, and display the received service recommendation to the user of the local terminal device;

wherein the local terminal device is a user mobile device configured to communicate with the frequency converter via a local communication link;

wherein the frequency converter is configured to transmit the frequency converter operation and status data to the local terminal device, periodically, in response to establishing the local communication link between the local terminal device and the frequency converter, or in response to a request from the local terminal device.

7. The system according to claim 6, wherein the frequency converter is configured to transmit the frequency converter operation and status data to the local terminal device, via the local communication link established between the local terminal device and the frequency converter.

8. The system according to claim 6, wherein the local terminal device is configured to receive the frequency converter operation and status data in response to the local terminal device scanning a corresponding QR code displayed on the frequency converter.

9. The system according to claim 6, wherein the frequency converter operation and status data comprises information on key performance indicators of the frequency converter and internal variables regarding the condition of the frequency converter.

10. The system according to claim 9, wherein the frequency converter history data comprises earlier information on key performance indicators of the frequency converter and internal variables regarding the condition of the frequency converter, and information on the type of the frequency converter.

11. An apparatus comprising at least one processor; and at least one memory including a computer program code, wherein the at least one memory and the computer program code are configured, with the at least one processor, to cause the apparatus to receive frequency converter operation and status data from a local terminal device via a communications network, the frequency converter operation and status data being obtained in the local terminal device via a local communication link established between the local terminal device and the frequency converter, the local terminal device being a user mobile device that communicates with the frequency converter via the local communication link;

compare the frequency converter operation and status data with frequency converter history data stored in a memory, by comparing latest received values with previous ones of one or more of power-on time, motor running hours, fan running hours, estimation of the direct current link capacitor lifetime, load current histogram, ambient temperature, insulated gate bipolar transistor temperature, control board temperature, frequency, direct current link voltage, current, status words, and internal control references;

based on the comparing, generate a service recommendation for the frequency converter; and based on the generating, transmit the service recommendation to the local terminal device via the communications network, in order the local terminal device to be able to display the service recommendations to the user of the local terminal device;

wherein the frequency converter operation and status data is transmitted from the frequency converter to the local terminal device, periodically, in response to establishing the local communication link between the local terminal device and the frequency converter, or in response to a request from the local terminal device.

12. The apparatus according to claim 11, wherein the frequency converter operation and status data comprises information on key performance indicators of the frequency converter and internal variables regarding the condition of the frequency converter, wherein the frequency converter history data comprises earlier information on key performance indicators of the frequency converter and internal variables regarding the condition of the frequency converter, and information on the type of the frequency converter.

13. A computer program product embodied on a non-transitory distribution medium readable by a computer and comprising program instructions which, when loaded into an apparatus and executed are operable to communicate frequency converter data in a communications system, comprising:

receive frequency converter operation and status data in a local terminal device, forward the frequency converter operation and status data from the local terminal device to a remote device via a communications network;

receive the frequency converter operation and status data in the remote device from the local terminal device;

compare, in the remote device, the frequency converter operation and status data received in the remote device with frequency converter history data stored in a memory, by comparing latest received values with previous ones of one or more of power-on time, motor running hours, fan running hours, estimation of the direct current link capacitor lifetime, load current histogram, ambient temperature, insulated gate bipolar transistor temperature, control board temperature, frequency, direct current link voltage, current, status words, and internal control references;

based on the compare, generate in the remote device a service recommendation for the frequency converter;

based on the generate, transmit the service recommendation from the remote device to the local terminal device via the communications network;

receive the service recommendation in the local terminal device from the remote device;

display the received service recommendation in the local terminal device to the user of the local terminal device;

wherein the local terminal device is a user mobile device that communicates with the frequency converter via a local communication link;

wherein the frequency converter operation and status data is transmitted from the frequency converter to the local terminal device, periodically, in response to establishing the local communication link between the local terminal device and the frequency converter, or in response to a request from the local terminal device.

* * * * *